United States Patent
Willson et al.

(10) Patent No.: US 10,417,251 B2
(45) Date of Patent: Sep. 17, 2019

(54) SYSTEM AND METHOD FOR STORAGE AND ANALYSIS OF TIME-BASED DATA

(71) Applicant: The Boeing Company, Chicago, IL (US)

(72) Inventors: Ian A. Willson, Bellevue, WA (US); John G. Wilson, Hazelwood, MO (US); Daniel D. Gilbertson, Hazelwood, MO (US); William D. Kelsey, Tukwila, WA (US)

(73) Assignee: THE BOEING COMPANY, Chicago, IL (US)

( * ) Notice: Subject to any disclaimer, the term of this patent is extended or adjusted under 35 U.S.C. 154(b) by 535 days.

(21) Appl. No.: 14/529,797

(22) Filed: Oct. 31, 2014

(65) Prior Publication Data

US 2016/0125053 A1 May 5, 2016

(51) Int. Cl.
- *G06F 16/25* (2019.01)
- *G06F 16/22* (2019.01)
- *G06F 16/21* (2019.01)
- *G06F 15/16* (2006.01)

(52) U.S. Cl.
CPC ......... *G06F 16/258* (2019.01); *G06F 16/211* (2019.01); *G06F 16/219* (2019.01); *G06F 16/2282* (2019.01)

(58) Field of Classification Search
CPC ......... G06F 17/30292; G06F 17/30569; G06F 16/211; G06F 16/258
USPC .................................................. 707/809, 746
See application file for complete search history.

(56) References Cited

U.S. PATENT DOCUMENTS

| | | | |
|---|---|---|---|
| 7,203,693 B2 * | 4/2007 | Carlbom | G06F 17/30793 707/999.1 |
| 8,271,430 B2 | 9/2012 | Willson | |
| 8,688,622 B2 | 4/2014 | Willson | |
| 2008/0091630 A1 * | 4/2008 | Bonissone | G05B 23/024 706/45 |
| 2009/0240517 A1 * | 9/2009 | Pelter | G06Q 50/14 705/306 |
| 2009/0299987 A1 * | 12/2009 | Willson | G06F 17/30563 707/999.004 |
| 2011/0320419 A1 * | 12/2011 | Johnston | G06F 16/219 707/703 |
| 2012/0150791 A1 * | 6/2012 | Willson | G06F 16/254 707/600 |
| 2014/0172803 A1 * | 6/2014 | Diaconu | G06F 17/30309 707/649 |
| 2014/0351233 A1 * | 11/2014 | Crupi | G06F 16/24568 707/706 |

* cited by examiner

*Primary Examiner* — Usmaan Saeed
*Assistant Examiner* — Brian E. Weinrich
(74) *Attorney, Agent, or Firm* — Patterson + Sheridan, LLP

(57) ABSTRACT

A system and method includes a data sensor providing sensor data. A database is configured to store the sensor data over time in rows of a table. A processor is configured to convert the table into a temporal format and collapse the rows in a temporal table. The temporal data can be normalized, and the normalized temporal data can be natively analyzed over normalized time periods, e.g., to improve an efficiency and/or accuracy of the analysis. The systems and methods can also be used to efficiently inter-operate with non-temporal data as needed.

20 Claims, 9 Drawing Sheets

402 — Standard form, ms offset

406

```
CREATE MULTISET TABLE
 MEASUREMENT_EVENT(
DATA_SET_ID_INT INTERGER NOT NULL,
  ML_ID_INT INTEGER NOT NULL,
  DATA_SET_SEQ INTEGER NOT NULL,
     NUMBER_VALUE NUMBER)
PRIMARY INDEX (DATA_SET_ID_INT,
          ML_ID_INT);
```

404 — Temporal form, time period

408

```
CREATE MULTISET TABLE
 MEASUREMENT_EVENT_TNORM(
DATA_SET_ID_INT INTERGER NOT NULL,
  ML_ID_INT INTEGER NOT NULL,
VALIDITY_PERIOD(TIMESTAMP(3)) NOT NULL,
     NUMBER_VALUE NUMBER)
PRIMARY INDEX (DATA_SET_ID_INT, ML_ID_INT);
```

FIGURE 4

SYSTEM AND METHOD FOR STORAGE AND ANALYSIS OF TIME-BASED DATA

FIELD

The systems and methods relate to efficient storage and analysis of time-based data, including sensor time-based data measurements.

BACKGROUND

Data processing includes the collection and manipulation of items of data to produce meaningful information. Analysis of data is a process of inspecting, cleaning, transforming, and modeling data with the goal of discovering useful information, suggesting conclusions, and supporting decision making. Data analysis can include multiple facets and approaches, encompassing diverse techniques under a variety of names, in different business, science, and social science domains. Data mining is a particular data analysis technique that focuses on modeling and knowledge discovery for predictive rather than purely descriptive purposes.

SUMMARY

According to one aspect, systems and methods can provide for a data sensor providing sensor data. A database is configured to store the sensor data over time in rows of a table. A processor is configured to convert the data in the table into a temporal format and collapse the rows in a temporal table. The temporal data can be normalized, and the normalized temporal data can be natively analyzed over normalized time periods, e.g., to improve an efficiency and/or accuracy of the analysis. The systems and methods can also be used to efficiently inter-operate with non-temporal data as needed.

An advantage of the normalized temporal rows is that there are no time alignment problems with the data, even if the frequency of data recording changes during the flight, e.g., if data is not recorded when the bus is busy. Since periods of time, not points in time, are processed, any missing portions of data do not cause issues because the periods of continuous time overlap as determined below. The time periods are also good for filtering out change below a threshold to create effective time periods within a specified filter condition.

Another advantage, is that by using a join query, the system provides an ability to accurately combine or join in SQL syntax data from multiple flights and sensors. Regardless of the period of the sensor (multiple values per second to a value every few seconds), the temporal representation accurately combines data of any period duration, unlike methods which first truncate or round to typically a lower frequency and then join points in time (e.g. sensor a time in milliseconds/1000=sensor b time in milliseconds/1000). This enables accurately answering a wide range of time-based questions, such as "Tell me exactly what times these N sensor conditions were concurrently true".

Therefore, the systems and methods normalize temporal data on the fly during queries to retain accuracy, unlike existing methods, while also being faster and simpler to use via native temporal SQL extensions. Normalization during queries retains accuracy, improves speed and simplifies use. In addition, data can be loaded quickly (e.g., hundreds of flight hours/hour) and complex analysis performed in seconds to minutes at a fleet level. The systems and methods improve on the de facto industry standard data model for measurements, updating the measurement time to a temporal time period that in turn is normalized to the longest period of time where the sensor value remains the same.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element.

FIG. 4 illustrates a Data Definition Language (DDL) view of the regular measurement event table and a DDL view of a normalized temporal equivalent of the regular measurement event table.

DETAILED DESCRIPTION

Systems and methods are described for loading, storing and querying data which can improve the efficiency and accuracy of providing analytics on large volumes of time-based data. The systems and methods allow for low cost interactive analytics to be done at a massive level. For purposes of explanation the data is described as aircraft data. Other kinds of time-based data can be used, including data on the Internet, data for systems of other types of vehicles, e.g., helicopters, spacecraft, trains, automobile, etc., data for manufacturing systems, flight test data, etc. The systems and methods can be used with various types of time-based data.

Figure 1:
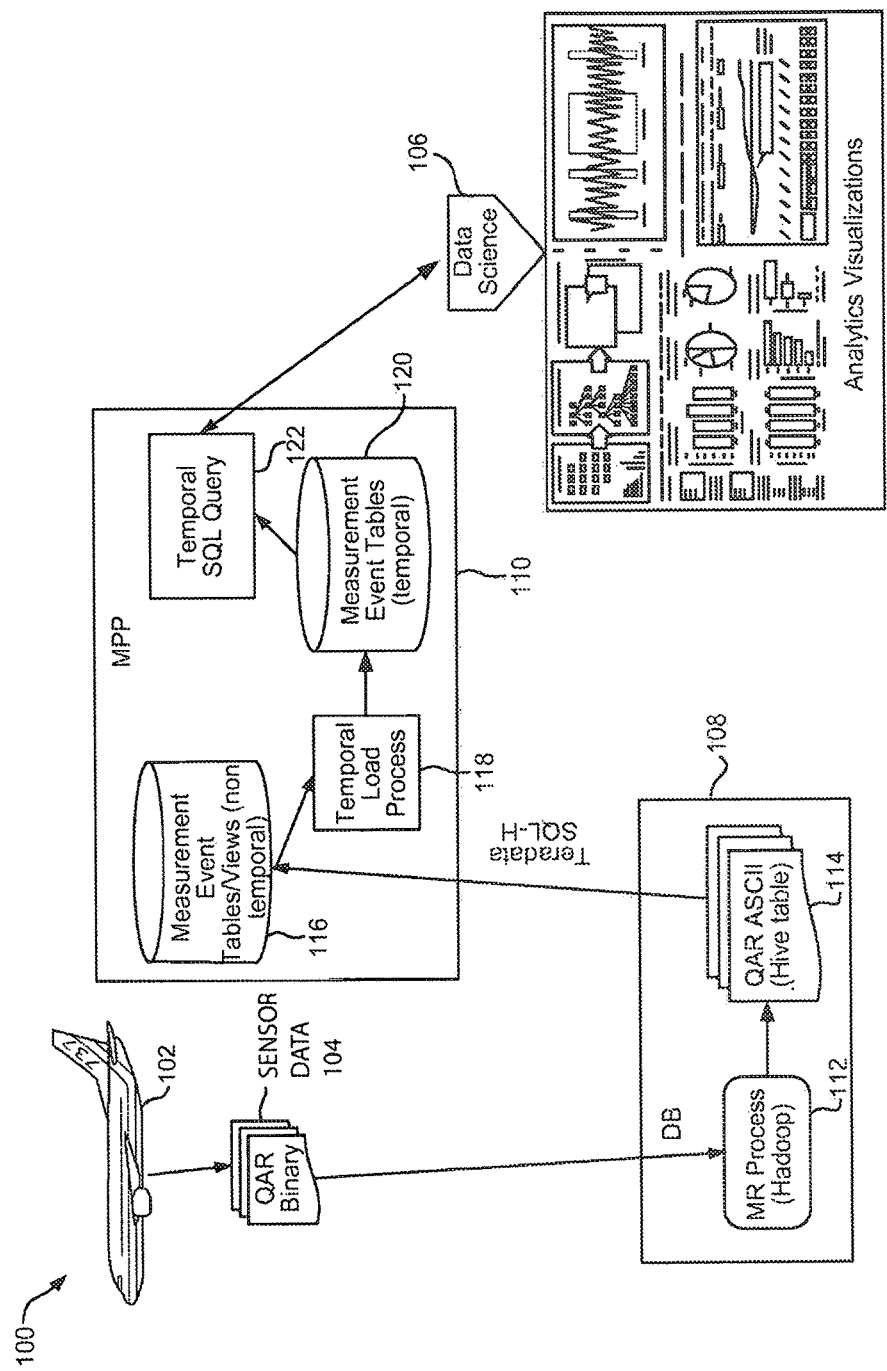
FIG. 1 is a block diagram of an environment for loading, storing and querying data.

FIG. 1 is a block diagram of an exemplary environment 100 for loading, storing and querying data. The exemplary environment 100 illustrates an aircraft 102 providing sensor data 104 produced by sensors located on the aircraft. The sensor data 104 can be analyzed by analytics visualization tools and presented on a display 106. The sensor data 104 is presented via a file system, data processing steps and a database area 108 to make the sensor data 104 available to a massively parallel processing relational database (MPP RDBMS) 110. The sensor data 104 includes quick access recorder (QAR) binary data and/or other data. The sensor data 104 is loaded to the database 108 either wirelessly while the aircraft 102 is travelling or at the terminal, e.g., via cellular, Wi-Fi, satellite, etc. communications. The sensor data 104 can also be loaded by a wired connection, e.g., via a portable hard drive removed from the aircraft 102, etc. In one example the database includes a Hadoop framework, including a Map Reduce (MR) process 112 that populates a QAR ASCII hive table 114. Hadoop is not needed, however, and decoding and preparing load files can be done onboard, using an application program and server or other methods. The ASCII hive table 114 can be transferred to measurement event (e.g. sensor data 104), non-temporal tables/views 116 of the MPP database 110. The tables/views 116 are sent through a temporal load process 118 to be converted to temporal tables 120. A temporal structured query language (SQL) query 122 can be executed on the temporal tables 120 to produce time-based analytics of the sensor data 104.

Temporal normalization used for data loading and processing and coded as a series of external SQL commands in Change Data Capture (CDC) is described in commonly assigned Boeing U.S. Pat. Nos. 8,271,430 and 8,688,622, which are incorporated by reference herein. The temporal normalization can be built into the massively parallel architecture database natively and for a use beyond data loading. The use is via the SQL command NORMALIZE used within the context of SELECT (outbound query) or INSERT SELECT (load data from another relational table).

For purposes of explanation, the sensor data 104 is received from sensors located on the aircraft 102, but other types of data can be used with the systems and methods described herein. The sensor data 104 can be analyzed for maintaining the aircraft, e.g., managing a health of the aircraft, and predicting and analyzing sensor detected faults, etc. The sensor data 104 can include engine parameters, positions of controls, positions of flaps, etc. that can be found on a maintenance data recorder of aircraft, at a massive level, e.g., collectively fleet-wide and stored offsite for years. With thousands of sensor data measurements at varying time periods averaging roughly one sensor reading per second, the environment 100 can provide the ability to store and analyze trillions of sensor measurement data on a relatively low cost MPP infrastructure, e.g., a Teradata, Hadoop file system and Hive database or other analytical database architecture having temporal normalization capability.

Data can be collected from sensors at different time intervals depending on the type of data being collected, e.g., on the order of one second, four seconds, eight seconds, half a second, 50 times per second, etc. In the aircraft example, sensor data 104 can be analyzed for the various sensors. For example, the sensors related to a flap handle can be compared with sensor data from past flights and/or sensor data for flap handles from similar aircraft as well as to other sensors that relate to the usage of flaps. Benchmark queries can be used to predict when an event is going to happen, e.g., a faulty sensor, and/or to determine that a fault is not a safety issue but a faulty sensor. A wide range of analytical temporal SQL queries are possible and each can vary based on the request and the demographics of the data being queried which can change over time. Each SQL query can leverage the processes described below as well as the full range of SQL operators available in Teradata 14.10 or above and recent ANSI standards (SQL:2011). As described in more detail below, data can be quickly loaded and compressed using lossless temporal methods and then analyzed using normalized temporal methods that directly operate on the period data type at a fleet level on the order of seconds to minutes instead of hours to days.

Figure 2:
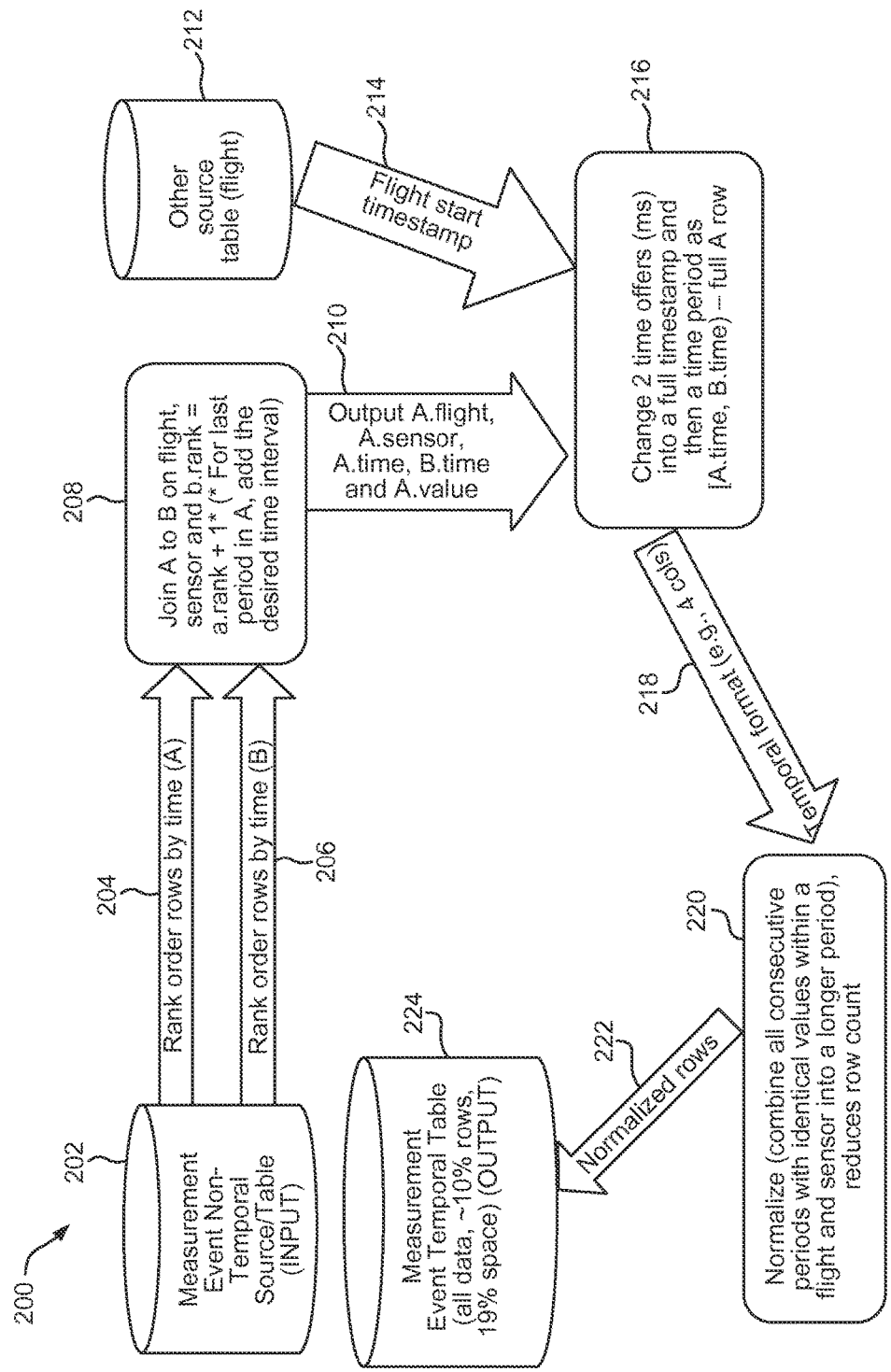
FIG. 2 is a flow diagram of an exemplary load process for loading non-temporal data as temporal data.
Figure 3:
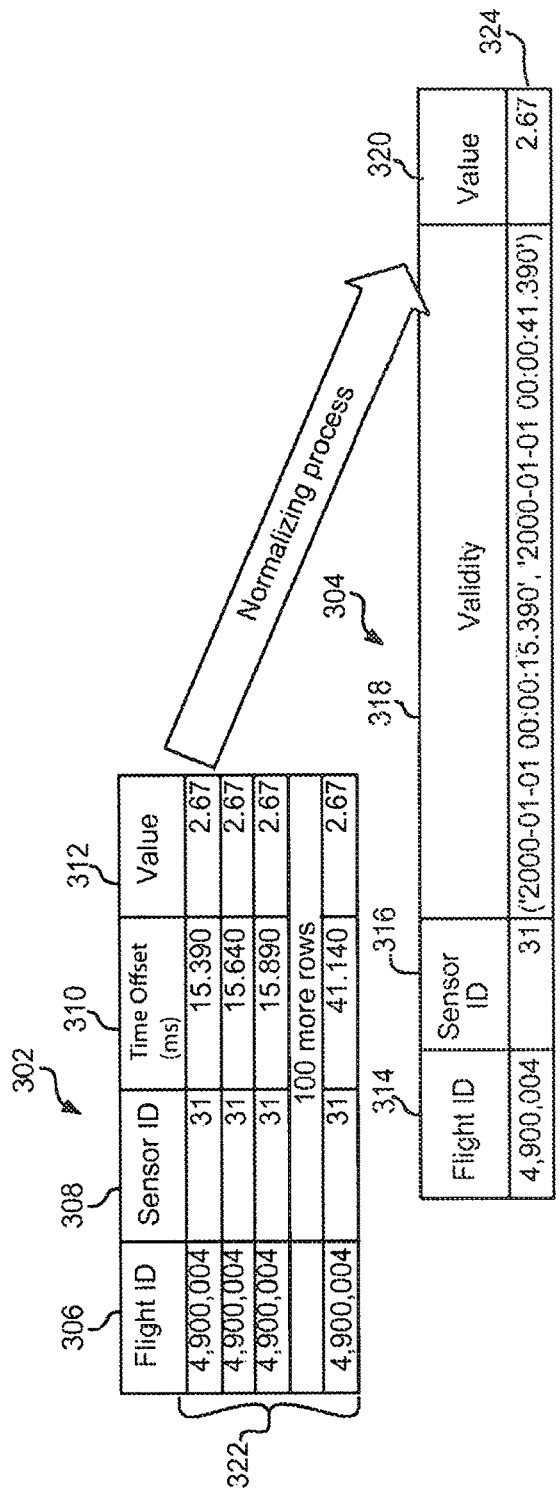
FIG. 3 illustrates tables for an exemplary data view of a regular measurement event table and a normalized temporal table equivalent to the regular measurement event table.

FIG. 2 is a flow diagram of an exemplary process 200 for loading non-temporal data as temporal data. The sensor data 104, or other data, can be inputted as non-temporal source/table (202). An exemplary non-temporal source/table 302 is illustrated in FIG. 3. The non-temporal source/table 302 is copied as two tables: table A (204) and a table B (206). For both table A and table B, the rows are sorted by flight and then by time. The rows of table B are shifted by 1 unit of time and table A is joined to shifted table B in a database for a determined flight and sensor (208). The process determines a maximum gap allowed when creating a period that spans from one point-in-time to the next. The joined tables A and B give in one row information about the current and next row of table A. The flight ID for table A, sensor ID for table A, time offset for table A, time for table B and table A value are outputted (210). Another database or lookup table 212 supplies the date and start time of flight (214) if not already present in the time measurements. With the start time of the flight the time offsets for tables A and B can be converted to timestamps, and then the time period established between measurements from one row to the next row (216).

Table A is now in temporal format (218). The temporal formatted table A is normalized to combine all consecutive periods with matching values 312 within a flight and sensor into a longer period, which reduces the row count (220) (e.g., normalized temporal table 304 and row 324 in FIG. 3). Table A with the normalized temporal rows (222) can be stored in a database (224). The normalized rows reduce the time measurements across the time dimension to the minimum necessary to capture the full detail of the data that is continually true across a span of time known as a time period. In one example, the normalized temporal table A includes about 10% less rows and saves about 19% space compared to the non-temporal source. This can represent a 75% improvement over the columnar compression method on top of additional methods such as block compression. Other savings in rows and space are possible. Therefore, normalized periods can be built from typical time offset non-temporal input data. The approach also applies to data stored with a fixed timestamp instead of a time offset from the start of the flight.

FIG. 3 illustrates tables for an exemplary data view of a regular measurement event non-temporal source/table 302 and a normalized temporal table 304 equivalent to the regular measurement event non-temporal source/table 302. In this example, the non-temporal source/table 302 contains four columns and hundreds of rows 322, but other amounts of columns and rows can be used. The first column contains flight identification (ID) 306 information, the second column includes a sensor ID 308, the third column 310 contains a time offset 310 for the sensor data 104, e.g., as an elapsed time in milliseconds (ms) from zero, e.g., a start of the flight, to the time of data was captured, and the fourth column includes a value 312 for the reading. The normalized temporal table 304 includes a same number of columns as the non-temporal source/table 302, but can include other numbers of columns. The first column includes the flight ID 314, the second column included the sensor ID 316, the third column includes the validity time period 318 and the fourth column includes the sensor value 320. The validity time period includes a starting and ending timestamp, inclusive of the data corresponding to the start timestamp and exclusive of the data corresponding to the end timestamp. The end of the time period is set to end at the next measurement of that sensor at that flight, prior to normalization.

Therefore, one row 324 takes the place of hundreds or thousands of rows 322. By storing the time offset in a time period data type, consecutive identical values can be collapsed (normalized) into the one row 324, both in the table data and during analytical queries.

FIG. 4 illustrates a Data Definition Language (DDL) view of the regular measurement event table 402 and a DDL view of a normalized temporal equivalent 404 of the regular measurement event table. To load the sensor data 104 in temporal form, the time that the data was captured 406 is changed to a time period 408. The Teradata syntax is illustrated. The temporal form for the sensor data 104 can be stored in a Teradata database or other relational database that supports time periods natively (e.g., SQL) or potentially with additional coding to utilize a pair of timestamps as a logical time period data type. As described in more detail below, the time period includes data from the beginning of the time period and excludes the data from the end to the time period.

Figure 5:
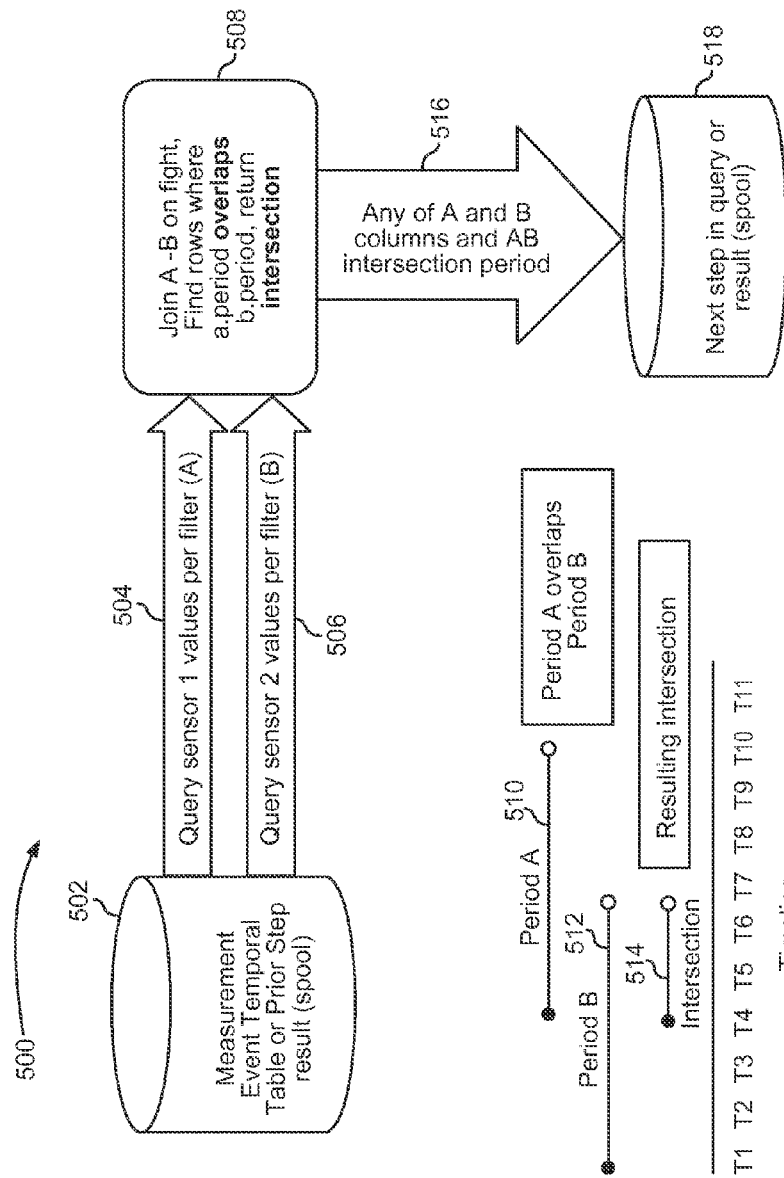
FIG. 5 is a flow diagram of an exemplary join query for combining two different time based measurements at the same point in time.

FIG. 5 is a flow diagram of an exemplary join query 500 for combining two different time based measurements at the same point in time. For example, to compare sensor measurements from different flights of the same aircraft or from different aircraft, the database 502 storing the temporal table A for sensor 1 is queried per a filter 504 along with the temporal table B for sensor 2 being queried per a filter 506. The database 502 can be implemented with a single database or multiple databases located together or in disparate locations. The database 502 or databases include the measurement event, e.g., target, temporal table. A single measurement over a single time period of continuous duration is stored as a single row (404) or prior query step results during the execution of a single or prior SQL query also stored as normalized time periods and referred to herein as spool. Table A is joined with table B (508), and the rows where the time period for table A 510 overlap with the time period for table B 512 are determined and the resulting intersection 514 for each overlap is returned. The resulting intersection 514 identifies the degree to which the time period for a single row of table A 510 overlaps with the time period for a single row of table B.

An exemplary SQL syntax is A overlap B, e.g., the table A time period overlaps the table B time period. The table A and table B columns and the period A and period B resulting intersection 514 can be outputted 516 and stored in database 518 as the next step in the query or result (spool). An advantage of the normalized temporal rows is that there are no time alignment problems with the data, even if the frequency of data recording changes during the flight, e.g., if data is not recorded when the bus is busy. Since periods of time, not points in time, are processed, any missing portions of data do not cause issues because the periods of continuous time overlap as determined in process 200. The time periods are also good for filtering out change below a threshold to create effective time periods within a specified filter condition.

The join query 500 provides an ability to accurately combine or join in SQL syntax data from multiple flights and sensors. Regardless of the period of the sensor (multiple values per second to a value every few seconds), the temporal representation accurately combines data of any period duration, unlike methods which first truncate or round to typically a lower frequency and then join points in time (e.g. sensor a time in milliseconds/1000=sensor b time in milliseconds/1000). As FIG. 5 demonstrates, temporal joins precisely determine if two periods of time overlap (typical join condition) and then precisely determine the time period of that overlap to return as a result to the next step. More than two periods of time overlap can be processed, as this can be nested to any number of joins and further results to the limits of system capacity. This enables accurately answering a wide range of time-based questions, such as "Tell me exactly what times these N sensor conditions were concurrently true".

Figure 6:
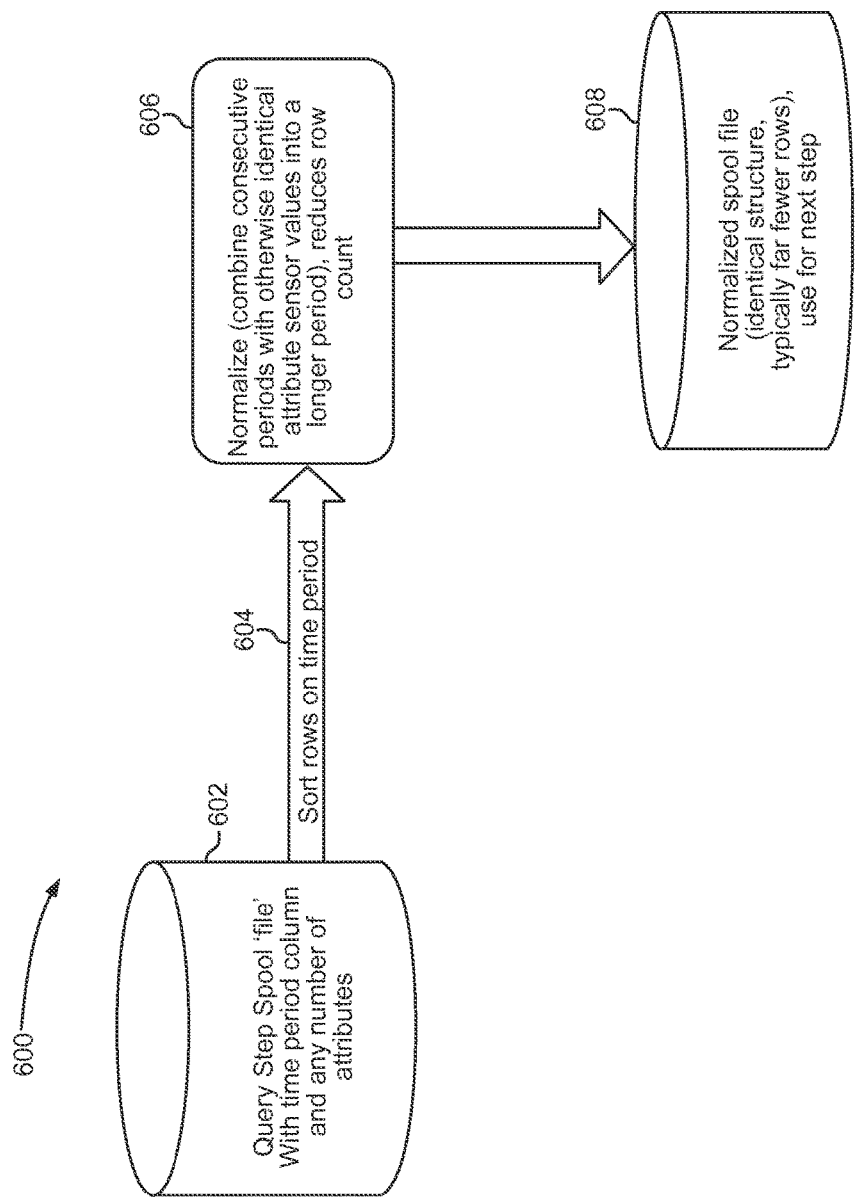
FIG. 6 is a flow diagram of exemplary temporal normalization for a query step.

FIG. 6 is a flow diagram of exemplary temporal normalization 600 for a query step. The temporal normalization may occur after any query step where rows can be combined. In one example, when analyzing data over an extended period of time, e.g., during a stable flight portion having a speed between Mach 0.7 and 0.9 and altitude between fifteen and thirty thousand feet, the time period can be normalized from thousands of individual point measurements to a single time period of several hours duration. The database 602 stores the query step spool file with the time period column and any other number of attributes, e.g., flight ID, sensor ID, value, etc. The rows are sorted for the stable flight time period (604), e.g. when the flight speed and altitude attributes are met. In one example, the stable flight period begins twenty minutes after takeoff and ends twenty minutes before landing. The spool file rows are normalized to combine consecutive periods with otherwise identical attribute sensor values into a longer period, to reduce the row count (606). For example, for a two hour stable cruise, 7,200 rows covering one second each of constant sensor data can be reduced to one row for the two hour period. The normalized spool file can then be used in subsequent steps of the query (608) or returned as a result to the requestor.

Therefore, the systems and methods normalize temporal data on the fly during queries to retain accuracy, unlike existing methods, while also being faster and simpler to use via native temporal SQL extensions. Normalization during queries retains accuracy, improves speed and simplifies use. In addition, data can be loaded quickly (e.g., hundreds of flight hours/hour) and complex analysis performed in seconds to minutes at a fleet level. The systems and methods improve on the de facto industry standard data model for measurements, updating the measurement time to a temporal time period that in turn is normalized to the longest period of time where the sensor value remains the same.

An efficiency of the temporal approach is normalization, both on persistent data as stored and newly created result data during a query. Reducing the cardinality of one table of a join reduces the computational complexity and provides good processing options on any database but particularly the massively parallel system utilized here (replicate the small table to join in place with the large table or spool result). FIG. 6 illustrates the process of normalizing data within any step of a query. A simple example is normalizing the time periods for a long duration condition, such as "stable flight". Instead of thousands or tens of thousands of rows per flight per sensor, a single row may suffice spanning the entire time that the condition is true. Normalization can be invoked wherever appropriate during a query.

Figure 7:
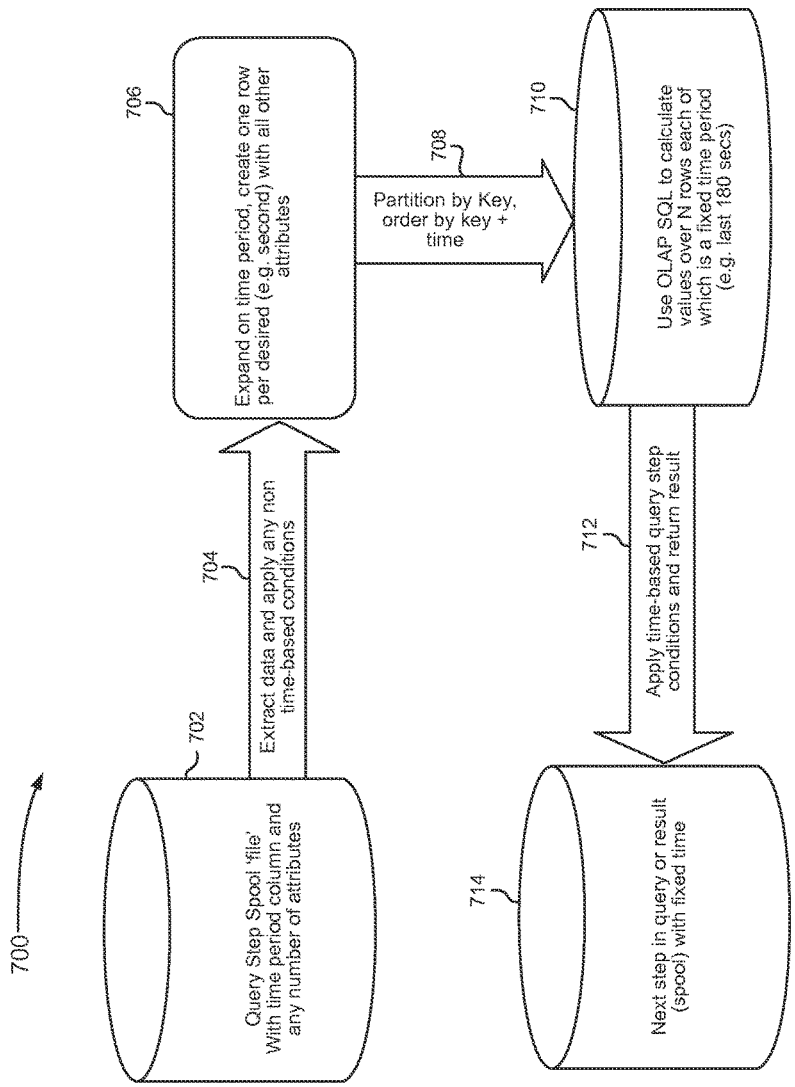
FIG. 7 is a flow diagram of exemplary process for un-converting a normalized table to fixed time data for fixed time query conditions.

FIG. 7 is a flow diagram of exemplary process 700 for un-converting a normalized table to fixed time data to apply fixed time query conditions. A subset of this process from 702 to 706 resulting in 714 can be used to convert time periods to fixed time for tools that cannot utilize time periods. The database 702 includes a query step spool file with a time period column and any number of other attributes. The varying size normalized time periods in a query step result are converted into a fixed interval (e.g. every second) in order to apply a condition across a fixed time period in a query (e.g., the prior 180 seconds). To do that, the spool file is extracted from database 702 and any non-time-based conditions are applied (704). An 'expand on' SQL command is utilized for the time period to create one row per desired period, e.g., one second, including the other corresponding attribute columns (706). The time-based table is partitioned by a key and ordered by the key plus the time (708). An online analytical processing (OLAP) SQL command, or equivalent, can be used to calculate values over N rows each of which is a fixed time period, e.g., the last 180 seconds (710). The time-based query step conditions are applied and results of the query returned (712). The returned result can be output to the next step in the query or result (spool) with the fixed time (714). Process 200 can be invoked to re-normalize and convert back to temporal format for subsequent query processing as required.

The un-converting process provides the ability to apply fixed time conditions to time periods of arbitrary length. Analytical conditions may span particular fixed periods and require examining each one (for every second look back 180 seconds). The ability to convert a variable length time period to a fixed time is used to ensure this functionality, which in turn can be normalized back into a more compact form using FIG. 6 after FIG. 7 is completed. Therefore, the fixed-time table can then be converted back to a time period based table as described above.

Figure 8:
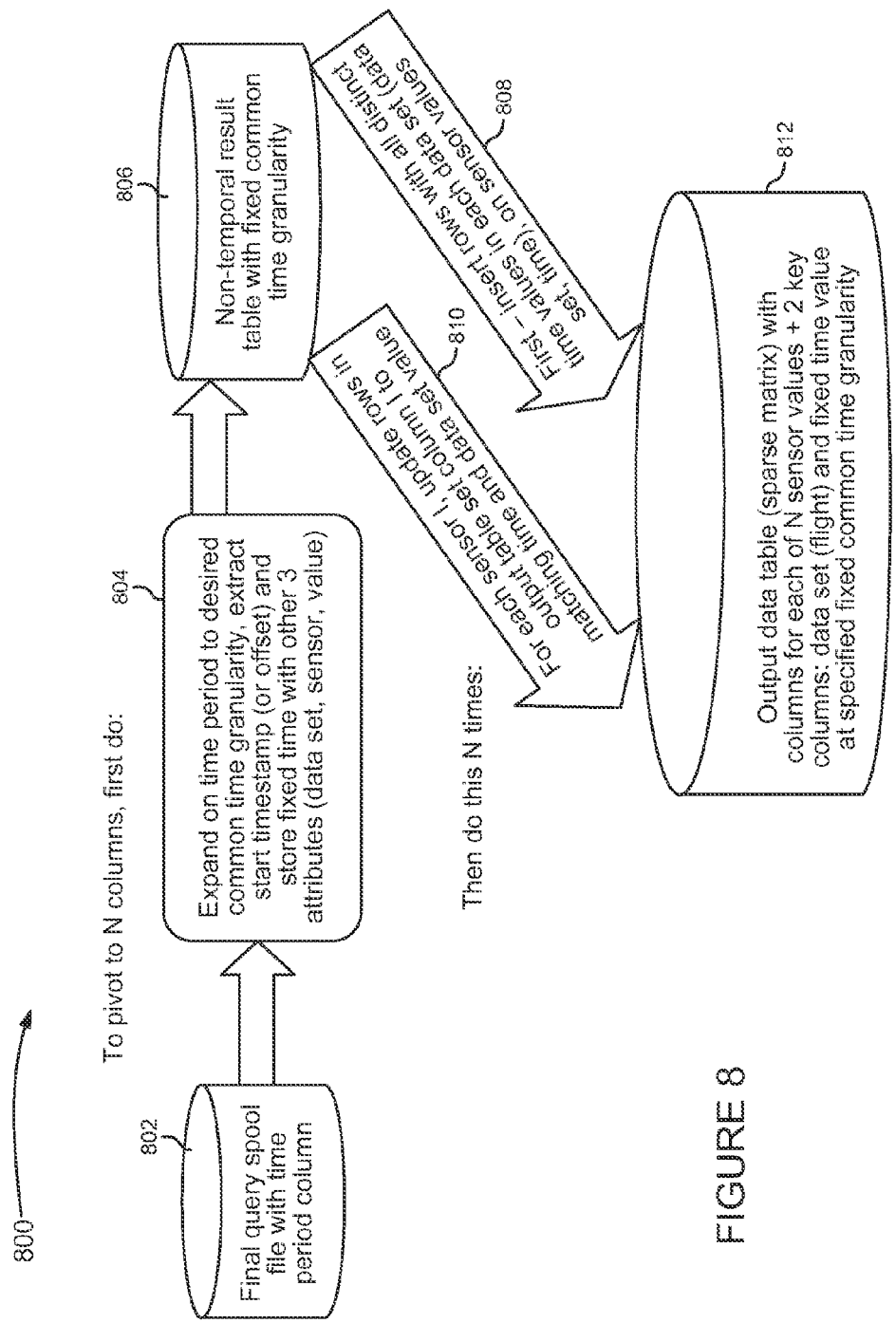
FIG. 8 is a flow diagram of exemplary process for pivoting and converting from a temporal format to a non-temporal format with a time attribute.

FIG. 8 is a flow diagram of exemplary process 800 for pivoting from a temporal format to a non-temporal format with a time attribute. Normalized temporal periods are converted in a normalized structure or query step to a de-normalized fixed time format where the output includes a data set (flight) and fixed time, and each column is a sensor called for in the result which recorded at that time. Other values will be null and the output represents a sparse matrix. The resulting sparse matrix can have any fixed time period as part of the key (along with the flight) and typically includes the most frequent period of all sensors. The sensor data is provided as columns only when recording at that time. The pivoted data can be used for further analytics or visualization use cases. The pivot format inherently requires a fixed time interval and points in time to be useful. To convert to fixed time without pivoting the table, the process can end with step 806.

The final query spool file with a column for time period data can be stored in database 802. The time period is expanded on to a determined common time granularity (804). The start timestamp (or offset) is extracted and the fixed time stored with any other corresponding attributes (e.g., data set, sensor ID, value, etc.). The corresponding attributes can be stored in the same row. The non-temporal result table is stored with the fixed common time granularity (806). For each of N sensors, first, insert the rows with all distinct time values in each data set (data set, time), without the sensor values (808). Then, for each sensor I, rows in the output table set column I are updated to the matching time and data set value (810). The inserting and updating are accomplished N times. The data table (sparse matrix) is outputted (812) with columns for each of the N sensor values plus two key columns: the data set (flight) and a fixed time value at specified fixed common time granularity.

Figure 9:
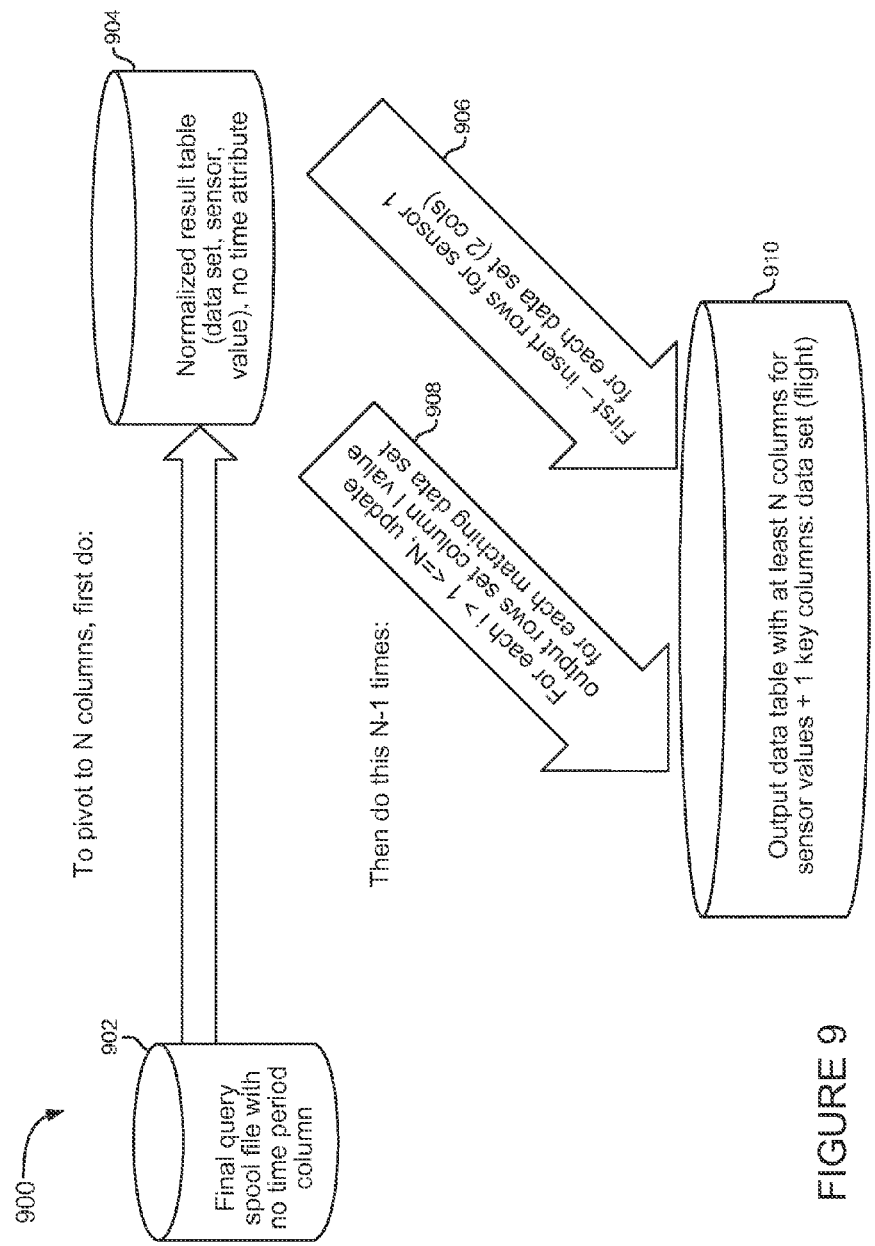
FIG. 9 is a flow diagram of exemplary process for pivoting and converting from a temporal format to a non-temporal format without a time attribute.

FIG. 9 is a flow diagram of exemplary process 900 for pivoting from a temporal format to a non-temporal format without a time attribute. A query output 902 can be converted without a time period in a normalized structure to a de-normalized format where the output includes a data set (flight) and each column is a sensor which recorded at that time. This is a subset of FIG. 8. Assuming each sensor is recorded on each flight all attributes of each row have a value. Therefore, the output of a query does not require a time element (aggregate for each flight and sensor) and accomplishes the pivot function for each flight.

The final query spool file output 902 with no time period column is saved as a normalized result table (e.g., including data set, sensor ID, value) 904. For N sensors, first the rows are inserted for sensor one for each data set (two columns) (906). For each i>1<N, update output rows set the column I value for each matching data set (908). The inserting and updating are done N−1 times. The data table is output (910) with at least N columns for sensor values plus 1 key column: data set (flight).

With regard to the above description, for efficiency on an MPP database, the temporal approach can reduce CPU use 42% over the next best method on identical hardware implemented in a conservative worst case (converting all output to non-temporal). This can directly lead to at least a 42% reduction in the cost of the MPP system assuming such a system is sized for throughput, which is a substantial portion of the infrastructure needed to support this function (combines hardware, software, storage and CPU as an appliance). In addition to efficiency and speed, an improvement is that the temporal approach is accurate with respect to time (no rounding or truncation), automatically adapts to data of any frequency and to gaps in data as noted in process 200 and finally is easier to work with due to the simple SQL temporal syntax natively available, making it possible for more analysts and data scientists to directly and interactively work with the data to understand, diagnose, predict and improve the reliability of our aircraft and our customer's fleets.

Time can be represented natively as a period data type inclusive of a starting timestamp and exclusive of an ending timestamp for any applicable range of time at a granularity equal to the measurement accuracy. The sensor measurements are temporally normalized with respect to the time period to use the minimum rows, with all consecutive identical rows for a given sensor and a given flight collapsed into a single row with a period enlarged to reflect the widest possible time for a given sensor value for a given flight. A load process is provided to convert the conventional sensor data format to temporal normalized sensor data. A query process is provided to query the time period data using temporal operators at their full level of accuracy, determining precise temporal overlap and returning the precise time intersection in a temporal period, along with many other temporal operators being applied (time-based average, moving average, etc.). A query process is provided which normalizes data during each appropriate step of a query to improve efficiency, collapsing multiple consecutive identical row sensor values into a longer time period prior to use in the next step or prior to return to the customer per the other conditions of that step. This can greatly improve join operations by reducing the size of at least one side of the join. A query process is described to convert to fixed time at any granularity from normalized varying-length time periods, such as to apply fixed time conditions (e.g. for each period of 180 seconds of condition X, calculate Y or set condition Z). A query process is provided to de-normalize the query result into a non-temporal form which represents attributes as columns at the lowest fixed time granularity if time is part of the output.

The systems and methods can solves the long-standing problem of providing a simple, low cost, high performance analytical capability for aircraft sensor data integrated with all other structured aircraft in-flight data using the latest release of the leading massively parallel relational database (e.g., Teradata 14.10+). The systems and methods can provides accurate time-based comparisons based on the exact time period of each sensor without resorting to rounding methods required for non-temporal methods. Periods of overlap are precisely determined and form the basis of subsequent calculations. The systems and methods can uniquely support integration with manufacturing or other data at run-time, which typically is already co-hosted on a massively parallel architecture or can be easily imported to join in at run time, providing a rich and complete picture of all available data. The systems and methods enable complex sensor data analytics (concurrent sensor conditions based on consecutive time periods and statistical metrics, statistical calculations, etc.) with simple SQL syntax (normalized & time period operators).

The systems and methods can store sensor data using less than 2 bytes pre row, a 15× reduction compared to the raw data size, 30-60× reduction on typical database sizes which add overhead for indexing and a 5× improvement on the best available alternative (block compression). This solves the space problem using currently available storage device densities. Years of multiple airline flights for their entire fleets can be stored and analyzed in a partial rack of Teradata. The systems and methods can speed analytical queries an average of 10× versus conventional methods on the identical massively parallel database hardware (e.g., Teradata), itself hundreds of times faster than conventional servers (4,330× faster than mySQL on a desktop). The systems and methods can avoid the need to use the less flexible and more complex alternative that otherwise is required to query sensor data on lower performing platforms, the sparse matrix, which represents all sensor measurements as columns and hence vary over time, by aircraft and by airline, requiring many separate structures.

The systems, methods and logic described above may be implemented in many different ways, in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:

1. A system of sensor data normalization, the system comprising:
    an aircraft data sensor providing sensor data, the sensor data including a flight identification, a sensor identification, a time offset, and a sensor value;
    a database configured to store the sensor data over time in uncollapsed rows of one or more source tables; and
    a processor configured to reduce a storage size required to store the sensor data and a processing overhead required to apply changes to the sensor data, while preserving semantics of the sensor data, by:
        converting at least a first of the one or more source tables into a temporal table having a temporal format, by joining each row in the first source table with a respective, subsequent row having matching flight and sensor identifications and a next time offset, wherein the first source table is joined with a shifted copy of the first source table, wherein the temporal table is joined with another table in order to determine an intersection resulting from time period overlap;
        reducing a row count of the temporal table by collapsing the rows having matching flight and sensor identifications and sensor values but differing time offsets, wherein the collapsed rows represent a time period derived from the differing time offsets and occupy a reduced storage size relative to the uncollapsed rows, the time period defined by a start timestamp and an end timestamp, wherein the time period is configured for expansion to a determined time granularity to convert the temporal table to a non-temporal table;
        dividing a set of incoming data into a plurality of partitions that are imported in order to yield imported data;
        identifying and sequencing a plurality of net changes between the imported data and the temporal table and via a set of relational algebra operators;
        normalizing the plurality of net changes with respect to a primary key within the one or more source tables; and
        generating and executing code in a predefined query language in order to apply the plurality of net changes to the collapsed rows with a reduced processing overhead relative to applying changes to the uncollapsed rows, after which an indication that the plurality of net changes is applied is output.

2. The system of claim 1, where the processor comprises a massively parallel processor.

3. The system of claim 1, where the processor is configured to query the temporal table.

4. The system of claim 1, where the time offset is converted to the start and end timestamps for the temporal format.

5. The system of claim 1, where the time period is expanded to the determined time granularity to convert the temporal table to the non-temporal table.

6. The system of claim 1, where the database comprises a relational database.

7. The system of claim 1, where the processor is configured to join the first source table with the shifted copy of the first source table.

8. The system of claim 1, wherein the processor is configured to collapse the rows via a normalizing command.

9. A system of sensor data normalization, the system comprising:
   a data sensor providing sensor data, the sensor data including a vehicle identification, a sensor identification, a time offset, and a sensor value;
   a database configured to store the sensor data over time in uncollapsed rows of one or more source tables; and
   a processor configured to reduce a storage size required to store the sensor data and a processing overhead required to apply changes to the sensor data, while preserving semantics of the sensor data, by:
      converting at least a first of the one or more source tables into a temporal table having a temporal format, by joining each row in the first source table with a respective, subsequent row having matching vehicle and sensor identifications and a next time offset, wherein the first source table is joined with a shifted copy of the first source table, wherein the temporal table is queried in order to join the temporal table with another table and determine an intersection resulting from time period overlap;
      reducing a row count of the temporal table by collapsing the rows having matching vehicle and sensor identifications and sensor values but differing time offsets, wherein the collapsed rows represent a time period derived from the differing time offsets and occupy a reduced storage size relative to the uncollapsed rows, the time period defined by a start timestamp and an end timestamp, wherein the time period is configured for expansion to a determined time granularity to convert the temporal table to a non-temporal table, wherein the rows are collapsed via a normalizing command;
      dividing a set of incoming data into a plurality of partitions that are imported in order to yield imported data;
      identifying and sequencing a plurality of net changes between the imported data and the temporal table and via a set of relational algebra operators;
      normalizing the plurality of net changes with respect to a primary key within the one or more source tables; and
      generating and executing code in a predefined query language in order to apply the plurality of net changes to the collapsed rows with a reduced processing overhead relative to applying changes to the uncollapsed rows, after which an indication that the plurality of net changes is applied is output.

10. The system of claim 9, where the processor comprises a massively parallel processor.

11. The system of claim 9, where the processor is configured to query the temporal table.

12. The system of claim 9, where the database comprises a relational database.

13. The system of claim 12, where the time offset is converted to the start and end timestamps for the temporal format.

14. The system of claim 9, where a query is performed on the temporal table and an output of the query is normalized.

15. A system of sensor data normalization, the system comprising:
   an aircraft data sensor providing sensor data, the sensor data including a flight identification, a sensor identification, a time offset, and a sensor value;
   a relational database configured to store the sensor data over time in uncollapsed rows of one or more source tables; and
   a parallel processor configured to reduce a storage size required to store the sensor data and a processing overhead required to apply changes to the sensor data, while preserving semantics of the sensor data, by:
      converting at least a first of the one or more source tables into a temporal table having a temporal format, by joining each row in the first source table with a respective, subsequent row having matching flight and sensor identifications and a next time offset, wherein the first source table is joined with a shifted copy of the first source table, wherein the temporal table is queried in order to join the temporal table with another table and determine an intersection resulting from time period overlap;
      reducing a row count of the temporal table by collapsing rows having matching flight and sensor identifications and sensor values but differing time offsets, wherein the collapsed rows specify a time period derived from the differing time offsets and occupy a reduced storage size relative to the uncollapsed rows, the time period defined by a start timestamp and an end timestamp, wherein the time period is configured for expansion to a determined time granularity to convert the temporal table to a non-temporal table, wherein the rows are collapsed via a normalizing command;
      dividing a set of incoming data into a plurality of partitions that are imported in parallel, in order to yield imported data;
      identifying and sequencing a plurality of net changes between the imported data and the temporal table and via a set of relational algebra operators;
      normalizing the plurality of net changes with respect to a primary key within the one or more source tables; and
      generating and executing code in a predefined query language in order to apply the plurality of net changes to the collapsed rows with a reduced processing overhead relative to applying changes to the uncollapsed rows, after which an indication that the plurality of net changes is applied is output.

16. The system of claim 15, wherein respective row is joined with the respective subsequent row in order to determine a time span between the respective row and the subsequent row, wherein the plurality of net changes is further normalized with respect to a specified time period that varies with sequences of rows within the primary key, wherein generating code to apply the plurality of net changes includes dynamically generating American National Standards Institute (ANSI)-complaint Structured Query Language (SQL) code based upon a table definition and a primary key using only ANSI-compliant SQL;
   wherein the relational database comprises, in respective instances, an online analytical processing (OLAP) database and an online transactional processing (OLTP)

database; wherein applying the plurality of net changes to the relational database comprises, in respective instances:
(i) compressing contiguous net change data into a minimum number of time periods;
(ii) generating and maintaining nanosecond level sequences within unique timestamps to ensure that all candidate rows of the plurality of net changes with unique non-key attribution are loaded into the relational database; and
(iii) non-intrusively loading the plurality of net changes into the relational database, thereby permitting continual query access;
wherein identifying and sequencing the plurality of net changes comprises, in respective instances:
(i) utilizing only set-structured query language to analyze interactions within and between the set of incoming data and data within the relational database; and
(ii) querying against a database catalog associated with the relational database, at run-time, for column name, data type information, and a primary key metadata table.

17. The system of claim 16, wherein the relational database comprises a temporal database, wherein the plurality of partitions includes a first partition and a second partition, wherein the set of incoming data includes a plurality of data records, wherein the parallel processor is further configured to perform an operation to load the plurality of data records into the relational database, the operation comprising:
determining that the data records include a snapshot of data from the one or more source tables;
determining an earliest source timestamp associated with a first data record in the data records;
identifying a set of primary keys that represent:
a data record in the temporal database associated with a source timestamp immediately prior to the earliest source timestamp; and
one or more data records in the temporal database that are associated with a source timestamp later than the earliest source timestamp;
importing the first partition into a pre-load table based on the identified set of primary keys;
importing the second partition into the pre-load table based on the identified set of primary keys;
applying the pre-load table to the temporal database;
detecting that an active data record in the temporal database is not associated with one of the plurality of data records; and
executing an implicit delete of the active data record based on: (i) said determining that the data records include the snapshot of data from the one or more source tables and (ii) said detecting.

18. The system of claim 17, wherein the first partition and the second partition are imported in parallel, wherein the operation further comprises, in respective instances:
(i) determining that a current quantity of parallel imports is less than a predetermined maximum quantity of parallel imports, wherein the first partition and the second partition are imported in parallel based on said determining; and
(ii) determining that a current quantity of parallel imports is greater than or equal to a predetermined maximum quantity of parallel imports, wherein the first partition and the second partition are imported sequentially based on said determining.

19. The system of claim 18, wherein dividing the data into the plurality of partitions comprises:
applying a hash function to at least one data record to create a hash value associated with the at least one data record; and
applying a modulus operator to the hash value based on a predetermined quantity of partitions to determine a partition number corresponding to and associated with the at least one data record.

20. The system of claim 19, wherein the operation further comprises:
identifying the data records in the first partition that include a plurality of fields other than a timestamp that are equal to non-key fields of a previously imported data record; and
excluding the identified data records when importing the first partition into the pre-load table;
wherein the set of incoming data is loaded concurrently with one or more queries executed by the relational database, wherein the set of incoming data is loaded in a manner that reduces a performance impact on the one or more queries relative to the plurality of net changes not being identified or sequenced, wherein the storage size and a processing overhead to load incoming changes to the sensor data are losslessly reduced.

* * * * *